US012658100B2

(12) United States Patent
Kim et al.

(10) Patent No.: US 12,658,100 B2
(45) Date of Patent: Jun. 16, 2026

(54) DISPLAY DEVICE AND CONTROL METHOD THEREOF FOR UPDATING DRIVING DATA BASED ON DRIVING INFORMATION

(71) Applicant: SAMSUNG ELECTRONICS CO., LTD., Suwon-si (KR)

(72) Inventors: Jihye Kim, Suwon-si (KR); Sungjin Lim, Suwon-si (KR); Kyeongjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/926,070

(22) Filed: Oct. 24, 2024

(65) Prior Publication Data

US 2025/0054435 A1 Feb. 13, 2025

Related U.S. Application Data

(63) Continuation of application No. PCT/KR2023/005640, filed on Apr. 26, 2023.

(30) Foreign Application Priority Data

Jun. 14, 2022 (KR) ........................ 10-2022-0072447

(51) Int. Cl.
*G09G 3/20* (2006.01)

(52) U.S. Cl.
CPC ....... *G09G 3/2096* (2013.01); *G09G 2354/00* (2013.01); *G09G 2370/042* (2013.01); *G09G 2370/08* (2013.01)

(58) Field of Classification Search
CPC .................................................. G09G 2370/08
See application file for complete search history.

(56) References Cited

U.S. PATENT DOCUMENTS 7,737,930 B2 6/2010 Inuzuka et al.
7,791,572 B2 9/2010 Hwang
(Continued)

FOREIGN PATENT DOCUMENTS

JP 2005-260651 A 9/2005
JP 5116208 B2 1/2013
(Continued)

OTHER PUBLICATIONS

International Search Report (PCT/ISA/210) issued Aug. 21, 2023 by the International Searching Authority in International Patent Application No. PCT/KR2023/005640.
(Continued)

*Primary Examiner* — Gustavo Polo
(74) *Attorney, Agent, or Firm* — Sughrue Mion, PLLC

(57) ABSTRACT

Disclosed is a display device including a display panel; a first storage storing first driving data for a plurality of panel types, a second storage storing driving information of the display panel, a third storage storing third driving data to drive the display panel, a timing controller that drives the display panel based on the third driving data stored in the third storage, and a main controller that updates the third driving data stored in the third storage based on second driving data corresponding to the driving information of the display panel stored in the second storage among the first driving data for the plurality of panel types stored in the first storage.

15 Claims, 10 Drawing Sheets

(56) References Cited

U.S. PATENT DOCUMENTS

| | | | | |
|---|---|---|---|---|
| 8,963,814 | B2 | 2/2015 | Kim et al. | |
| 9,412,292 | B2 | 8/2016 | Lee | |
| 9,812,063 | B2 | 11/2017 | Lee et al. | |
| 9,837,044 | B2 | 12/2017 | Kim | |
| 10,460,653 | B2 | 10/2019 | Morris et al. | |
| 10,923,067 | B2 | 2/2021 | Lee et al. | |
| 11,093,003 | B2 | 8/2021 | Jung | |
| 11,151,941 | B1 | 10/2021 | Shikata et al. | |
| 11,222,597 | B2 | 1/2022 | Bong et al. | |
| 11,908,381 | B2 | 2/2024 | Goetz et al. | |
| 2007/0077033 | A1 | 4/2007 | Shirai et al. | |
| 2009/0225095 | A1* | 9/2009 | Kojima ................ | G09G 3/3611 345/545 |
| 2012/0133659 | A1 | 5/2012 | Masnikosa et al. | |
| 2013/0300925 | A1 | 11/2013 | Sakariya et al. | |
| 2022/0148470 | A1 | 5/2022 | Orio et al. | |

FOREIGN PATENT DOCUMENTS

| | | | |
|---|---|---|---|
| JP | 2013-546025 | A | 12/2013 |
| JP | 2014-10762 | A | 1/2014 |
| JP | 5444372 | B2 | 3/2014 |
| JP | 2021-192093 | A | 12/2021 |
| KR | 10-0712436 | B1 | 4/2007 |
| KR | 10-2007-0094078 | A | 9/2007 |
| KR | 10-0952837 | B1 | 4/2010 |
| KR | 10-2015-0041441 | A | 4/2015 |
| KR | 10-2017-0081047 | A | 7/2017 |
| KR | 10-1992159 | B1 | 6/2019 |
| KR | 10-2101361 | B1 | 4/2020 |
| KR | 10-2020-0120837 | A | 10/2020 |
| KR | 10-2021-0040588 | A | 4/2021 |
| KR | 10-2021-0044921 | A | 4/2021 |
| KR | 10-2253446 | B1 | 5/2021 |
| KR | 10-2021-0082702 | A | 7/2021 |
| KR | 10-2021-0084244 | A | 7/2021 |
| KR | 10-2623163 | B1 | 1/2024 |

OTHER PUBLICATIONS

Written Opinion (PCT/ISA/237) issued Aug. 21, 2023 by the International Searching Authority in International Patent Application No. PCT/KR2023/005640.

Communication dated Jan. 18, 2026, issued by the Korean Ministry of Intellectual Property in Korean Application No. 10-2022-0072447.

* cited by examiner

DISPLAY DEVICE AND CONTROL METHOD THEREOF FOR UPDATING DRIVING DATA BASED ON DRIVING INFORMATION

CROSS REFERENCE TO RELATED APPLICATIONS

This application is a bypass continuation application of International Application No. PCT/KR2023/005640, filed on Apr. 26, 2023, which is based on and claims priority to Korean Patent Application No. 10-2022-0072447, filed on Jun. 14, 2022, in the Korean Patent Office, the disclosures of which are incorporated by reference herein in their entireties.

BACKGROUND

1. Field

The disclosure relates to a display device and method of controlling the same, and more particularly, to a display device and method of controlling the same to update driving data.

2. Description of Related Art

Display devices are output devices for visually presenting obtained or stored image information for the user, and are used in various areas such as homes or businesses.

For example, there are many different display devices such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display device for reproducing images like advertisements or films, or other various kinds of audio/video systems.

The display device may use various types of display panels to display images. For example, the display device may include a cathode ray tube panel, a light emitting diode (LED) panel, an organic LED (OLED) panel, a liquid crystal display (LCD) panel, etc.

Driving data is data to operate a driving board such as a timing controller board for driving the display device or panel. As the respective display panels have different characteristics, the driving data is created to be tuned in to each panel.

In the related art panel production process, e.g., screen defects are detected by searching for and connecting each board having the driving data that matches each panel or by driving the panel after updating the driving data that matches the panel in a storage device mounted on the driving board. Furthermore, in the case that the driving data needs to be updated, a service person in charge has to go through a cumbersome procedure for searching a manual for data for updating. There are more than tens of types of the driving data for the display device, making it difficult to find driving data for a model to be updated, which often causes human errors such as wrong driving data updates.

SUMMARY

One or more embodiments relate to a display device and method of controlling the same, which is capable of automatic updating by searching for driving data that matches unique information of a display panel from integrated data stored in a storage device.

In accordance with an aspect of the disclosure, there is provided a display device including: a display panel; a first storage storing first driving data for a plurality of panel types; a second storage storing driving information of the display panel; a third storage storing third driving data to drive the display panel; a timing controller configured to drive the display panel based on the third driving data stored in the third storage; and a main controller configured to update the third driving data stored in the third storage based on second driving data corresponding to the driving information of the display panel stored in the second storage among the first driving data for the plurality of panel types stored in the first storage.

The display device may further include an input interface configured to receive a request to update at least one of the first driving data, the second driving data, or the third driving data, wherein the main controller is configured to update the third driving data stored in the third storage based on the request to update the at least one of the first driving data, the second driving data, or the third driving data being received.

The main controller is configured to, based on the request to update the at least one of the first driving data, the second driving data, or the third driving data being received, search for the second driving data corresponding to the driving information of the display panel stored in the second storage among the first driving data for the plurality of panel types stored in the first storage.

The main controller is configured to update the third driving data stored in the third storage based on the searched for second driving data corresponding to the driving information of the display panel stored in the second storage among the first driving data for the plurality of panel types stored in the first storage.

The main controller is configured to compare the third driving data stored in the third storage with the second driving data corresponding to the driving information of the display panel stored in the second storage among the first driving data for the plurality of panel types stored in the first storage.

The main controller is configured to update the third driving data stored in the third storage based on the second driving data corresponding to the driving information of the display panel stored in the second storage among the first driving data for the plurality of panel types stored in the first storage being of an upper version.

The main controller is configured to update the third driving data stored in the third storage based on a version of the third driving data stored in the third storage being different from a version of the second driving data corresponding to the driving information of the display panel stored in the second storage among the first driving data for the plurality of panel types stored in the first storage as a result of the comparing.

The driving information of the display panel may include at least one of gate timing information, image quality characteristics information, or driving voltage information.

The timing controller is configured to drive the display panel based on the updated third driving data.

The display device may further include a communicator configured to communicate with an external server, wherein the main controller is configured to store the first driving data for a plurality of panel types received from the communicator in the first storage.

In accordance with an aspect of disclosure, there is provided a method of controlling a display device including searching for second driving data corresponding to the driving information of the display panel stored in the second storage among the first driving data for the plurality of panel types stored in the first storage; updating the third driving data stored in the third storage based on the searched for second driving data corresponding to the driving information of the display panel stored in the second storage among the first driving data for the plurality of panel types stored in the first storage; and driving the display panel based on the updated third driving data.

The method may further include receiving a request to update at least one of the first driving data, the second driving data, or the third driving data, wherein the updating of the third driving data may include updating the third driving data stored in the third storage based on the request to update the at least one of the first driving data, the second driving data, or the third driving data being received.

The updating of the third driving data may include comparing the third driving data stored in the third storage with the second driving data corresponding to the driving information of the display panel stored in the second storage among the first driving data for the plurality of panel types stored in the first storage.

The updating of the third driving data may include updating the third driving data stored in the third storage based on the second driving data corresponding to the driving information of the display panel stored in the second storage among the first driving data for the plurality of panel types stored in the first storage being of an upper version.

The updating of the third driving data may include updating the third driving data stored in the third storage based on a version of the third driving data stored in the third storage being different from a version of the second driving data corresponding to the driving information of the display panel stored in the second storage among the first driving data for the plurality of panel types stored in the first storage as a result of the comparing.

According to the one or more embodiments, an issue of having to looking for a main board or a driving board with driving data that matches a display panel for replacement whenever there is a change in model in producing the display panel may be resolved by automatically searching for driving data corresponding to unique information of the display panel and updating, thereby reducing the process track time.

Furthermore, there may be no need for a service person in charge to search for the driving data that matches a particular panel in person for updating, thereby reducing the time required for updating and reducing risks of human error occurrences.

BRIEF DESCRIPTION OF THE DRAWINGS

The above and other aspects and/or features of one or more embodiments of the present disclosure will be more apparent from the following description taken in conjunction with the accompanying drawings, in which.

DETAILED DESCRIPTION

Figure 1:
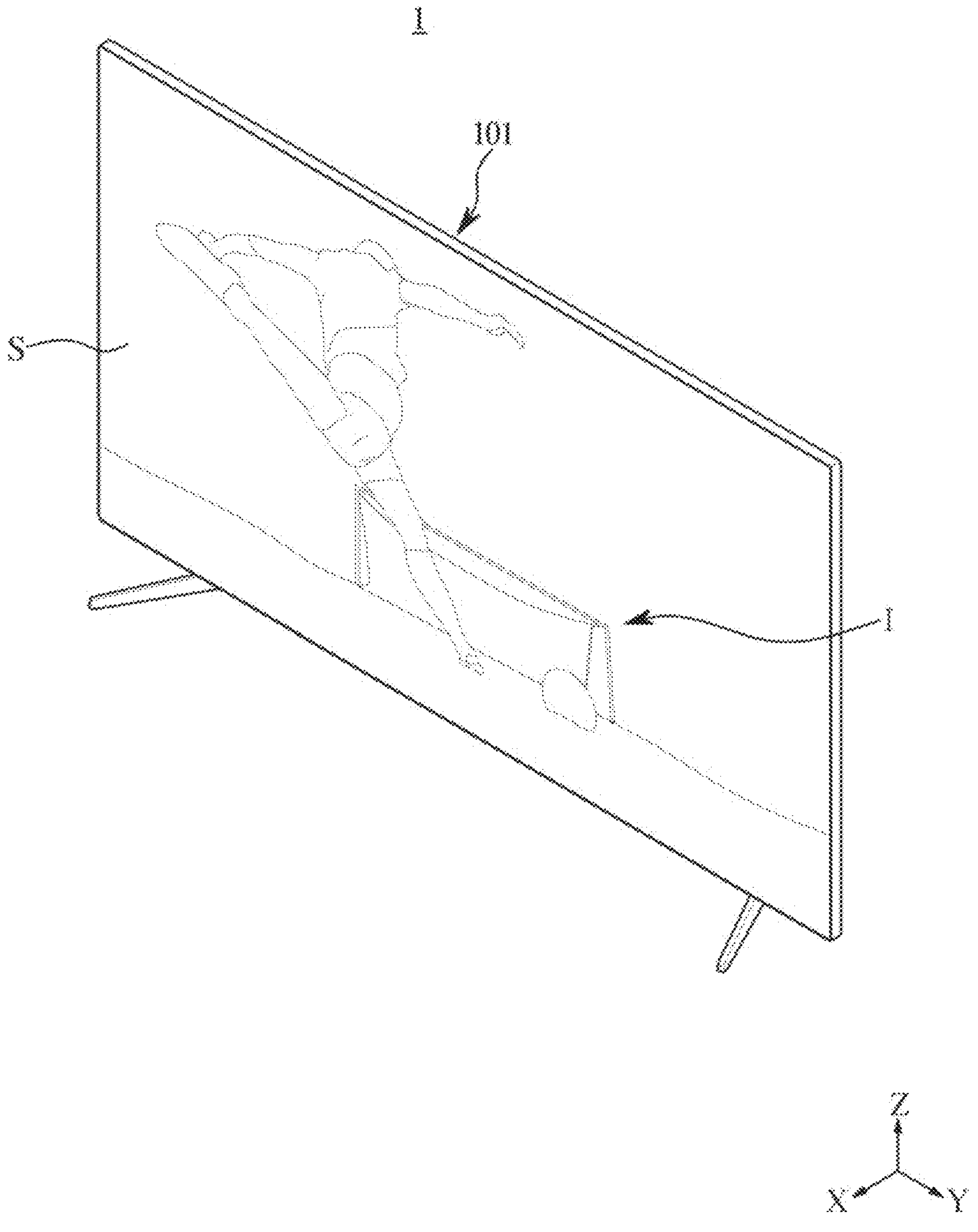
FIG. 1 is an exterior view of a display device, according to an embodiment.

Embodiments and features as described and illustrated in the disclosure are merely examples, and there may be various modifications to the embodiments and drawings.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, throughout the specification, when a component is "connected" or "coupled" to another component, it includes not only a case that the component is directly connected or coupled to the other component but also a case that they are indirectly connected or coupled to each other.

The terms including ordinal numbers like "first" and "second" may be used to explain various components, but the components are not limited by the terms. The terms are only for the purpose of distinguishing a component from another. Thus, a first component discussed below could be termed a second component and vice versa, without departing from the teachings of the disclosure. Descriptions shall be understood as to include any and all combinations of one or more of the associated listed items when the items are described by using the conjunctive term "~ and/or ~," or the like.

Reference will now be made to embodiments of the disclosure, which are illustrated in the accompanying drawings.

Figure 2:
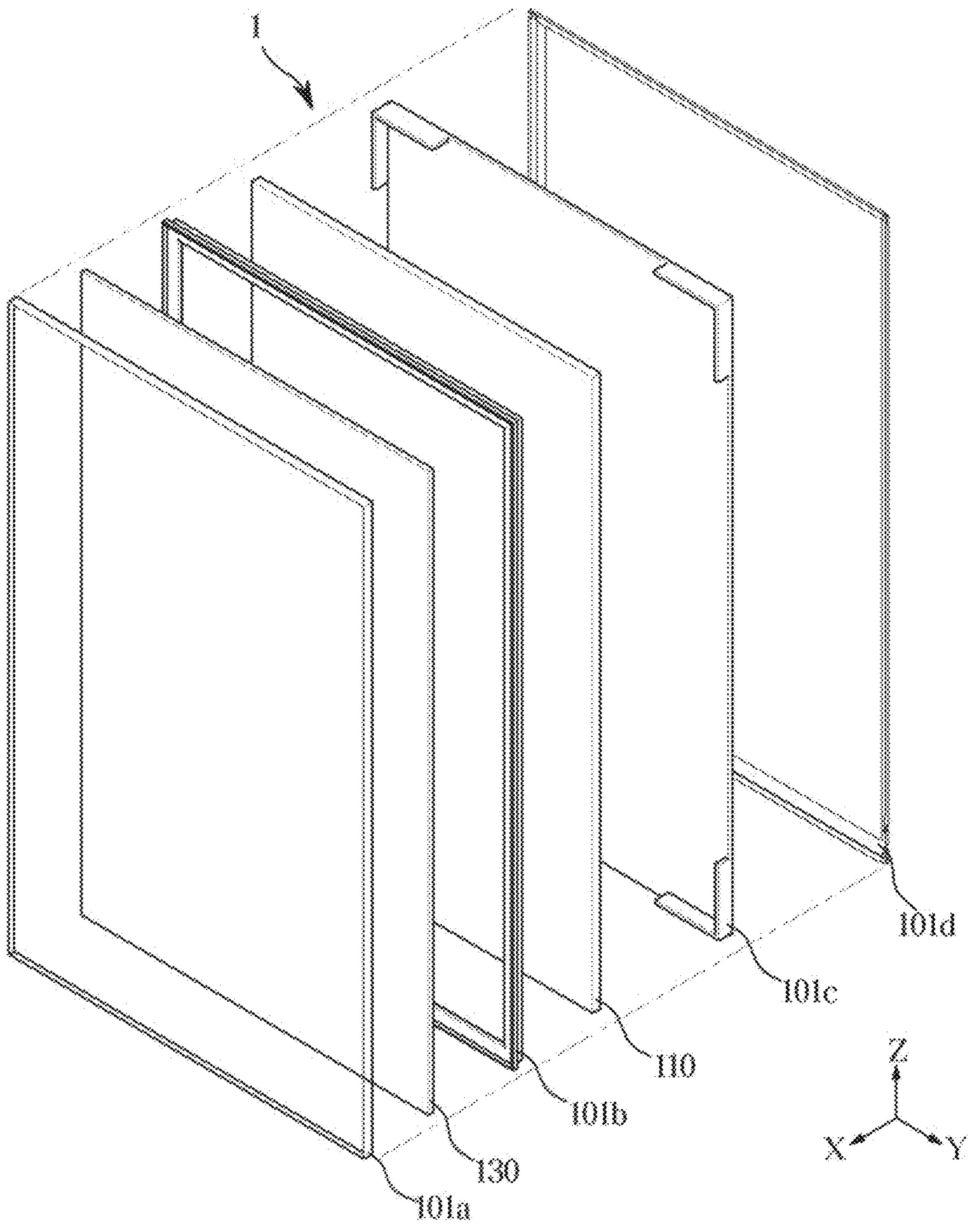
FIG. 2 is an exploded perspective view of some components of a display device, according to an embodiment.

FIG. 1 is an exterior view of a display device, according to an embodiment, and FIG. 2 is an exploded perspective view of some components of a display device, according to an embodiment.

A display device 1 is a device that is able to process image signals received from the outside and visually present the processed image. In the following description, it is assumed that the display device 1 is a television (TV), but embodiments of the disclosure are not limited thereto. For example, the display device 1 may be implemented in various forms, such as a monitor, a portable multimedia device, a portable communication device, a portable operation device, or any device capable of visually presenting images, without being limited thereto.

The display device 1 may also be a large format display (LFD) installed outdoors such as on a rooftop of a building or at a bus stop. The display device 1 is not, however, exclusively installed outdoors, but may be installed at any place, even indoors with a lot of foot traffic, e.g., at subway stations, shopping malls, theaters, offices, stores, etc.

The display device 1 may receive video and audio signals from various content sources and output video and audio corresponding to the video and audio signals. For example, the display device 1 may receive television (TV) broadcast content through a broadcast receiving antenna or a cable, receive content from a content reproducing device, or receive content from a content providing server 2 of a content provider.

The display device 1 may include a self-luminous display panel to display an image using an element that emits light by itself. The self-luminous display panel includes a light emitting diode (LED) panel. Furthermore, the display device 1 may include a non-self-luminous display panel that displays an image by passing or blocking rays emitted from a backlight unit. The non-self-luminous display panel includes e.g., a liquid crystal display panel.

As shown in FIG. 1, the display device 1 may include a main body 101 for accommodating a plurality of components for displaying images, and a screen S arranged on one side of the main body 101 for displaying image I.

The main body 101 forms the exterior of the display device 1, and the components for the display device 1 to display the image I may be included in the main body 101. Although the main body 101 of FIG. 1 is shaped like a flat plate, it is not limited thereto. For example, the main body 101 may have a curved form with left and right ends relatively coming forward and the other parts curved backward.

The screen S may be formed on the front of the main body 101 for displaying visual information, i.e., the image I. For example, the screen S may display still or moving images in two-dimensional (2D) or three-dimensional (3D).

The display device 1 may be implemented in a stand type as shown in FIG. 1, or mounted on a wall and implemented in the wall-mount type. Furthermore, the display device 1 may be implemented in a rectangular form with the horizontal length (in the direction of Y-axis) shorter than the vertical length (in the direction of Z-axis) as shown in FIG. 1, or may be implemented in a rectangular form with the horizontal length longer than the vertical length, or implemented in a square form. There are no limitations on the way the display device 1 is supported or the shape of the display device 1.

In the following embodiments, a direction in which the image is output (+X direction) is defined as a forward direction and the opposite direction is defined as a backward direction. The XYZ coordinate system is based on the display device 1, and it is assumed that there is no change of the coordinate system based on the display device 1 even when the display device 1 does not stand as shown in FIG. 1 but lies.

A backlight unit 110 that emits surface light in the forward direction and a liquid crystal panel 130 that blocks or transmits the light emitted from the backlight unit 110 depending on an image signal to be output may be arranged in the main body 101.

A bezel 101*a*, a frame middle mold 101*b*, a bottom chassis 101*c* and a rear cover 101*d* for supporting and fixing the liquid crystal panel 130 and the backlight unit 110 may also be arranged in the main body 101.

The backlight unit 110 is installed behind the liquid crystal panel to supply light required by the liquid crystal panel to display an image. The backlight unit may be classified into an edge-type backlight unit with light sources placed on edges of the liquid crystal panel and a direct-type backlight unit with light sources placed in a two dimensional (2D) array on the bottom of the liquid crystal panel.

The backlight unit 110 may include a plurality of point light sources for emitting monochromatic light such as blue light or white light, and may refract, reflect, and scatter the light emitted from the point light sources to convert the light to uniform surface light.

The liquid crystal panel 130 may be arranged in front of the backlight unit 110 for blocking or transmitting the light emitted from the backlight unit 110 to form an image.

The liquid crystal panel 130 may be made up with a plurality of pixels arranged in a 2D matrix. The plurality of pixels P included in the liquid crystal panel 130 may separately block or transmit the light from the backlight unit 110, and the light emitted from the plurality of pixels may form the image to be displayed on the screen S.

A procedure for updating driving data to drive the display panel will now be described.

Figure 3:
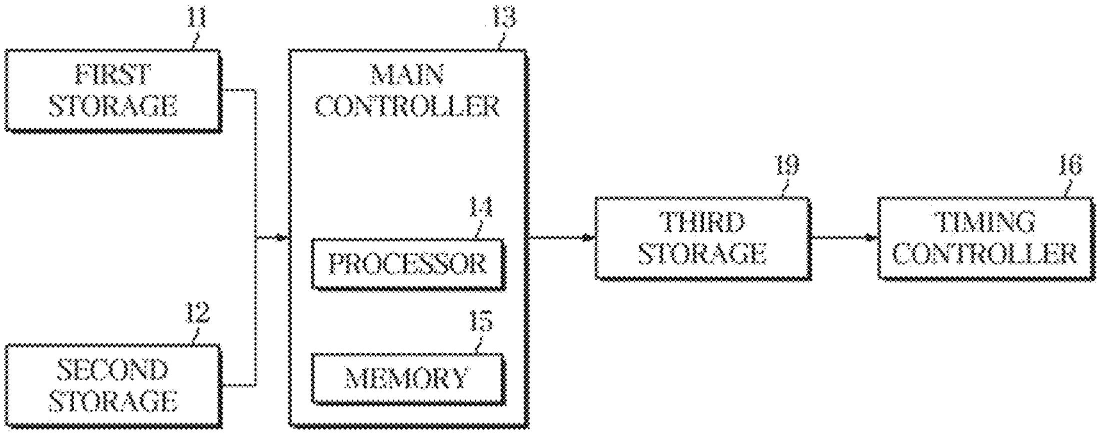
FIG. 3 is a control block diagram of a display device, according to an embodiment.

FIG. 3 is a control block diagram of a display device, according to an embodiment.

Referring to FIG. 3, the display device 1 according to an embodiment may include a first storage 11, a second storage 12, a third storage 19, a main controller 13 and a timing controller 16.

The first storage 11 may store driving data for a plurality of panel types. Display panels may have different gate timing, image quality characteristics and driving voltages, so there may be driving data that matches each display panel.

The first storage 11 may store driving data that matches the various types of display panels.

The second storage 12 may store driving information of the display panel. Specifically, for the display panel, information about gate timing, information about image quality characteristics and information about a driving voltage may be stored.

The driving information is not limited thereto, but may include various information that may indicate unique information of the display panel.

The third storage 19 may store driving data to drive the display panel. Specifically, the timing controller 16 controls the display panel included in the display device 1, in which case the timing controller 16 may drive the display panel based on the driving data stored in the third storage 19.

The timing controller 16 may control operation of the display panel based on the driving data stored in the third storage 19 as described above. In other words, the driving data stored in the third storage 19 may be received through communication with the third storage 19, and based on this, the display panel may be operated.

The third storage may be physically separated from or coupled with the timing controller, and in the latter case, the third storage may serve as a memory in the timing controller 16.

In this case, the timing controller 16 may control the display panel based on the driving data stored in the third storage 19.

The aforementioned first storage 11, second storage 12 and third storage 19 are merely divided by data stored therein, but may also be implemented without being physically separated but in the form that shares at least one memory.

In other words, the first storage 11, the second storage 12 and the third storage 19 may be implemented as physically separate memories, and may be implemented in the form that shares at least one memory and stores different data.

The main controller 13 may include a memory 15 for storing a control program and control data to update the driving data of the display device 1, and the processor 14 for generating control signals according to the control program and control data stored in the memory 15. The memory 15 and the processor 14 may be implemented integrally or separately.

The memory 15 may store a program for updating the driving data, and a program and data for controlling the display device 1.

The memory 15 may include a volatile memory for temporarily storing data, such as a static random access memory (SRAM), a dynamic random access memory (DRAM), or the like. The memory 15 may also include a non-volatile memory for storing data for a long time, such as a read-only memory (ROM), an erasable programmable ROM (EPROM), an electrically erasable programmable ROM (EEPROM), etc.

The processor 14 may include many different logic circuits and operation circuits, process data according to the program provided from the memory, and generate control signals according to the result of the processing.

The main controller 13 may update the driving data stored in the third storage 19 based on driving data corresponding to the driving information of the display panel stored in the second storage 12 among the driving data for the plurality of panel types stored in the first storage 11.

Specifically, driving data corresponding to the unique driving information of the display panel stored in the second storage 12 is searched for from the first storage 11 that stores various types of driving data, and based on the found driving data, the driving data stored in the third storage 19 may be updated.

In this case, the timing controller 16 may drive the display panel based on the updated driving data in the third storage 19.

Figure 4:
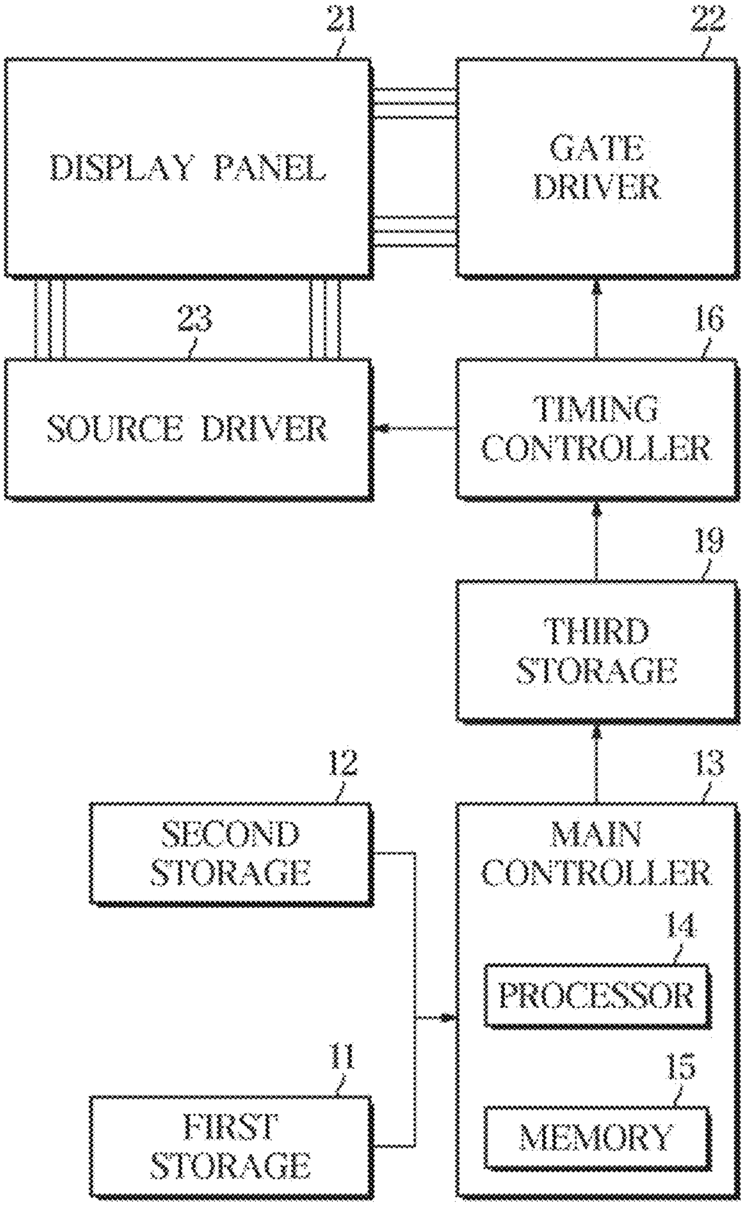
FIG. 4 is a control block diagram of a display device, according to an embodiment.

FIG. 4 is a control block diagram of a display device, according to an embodiment.

The timing controller 16 may convert an image signal sent from the main controller 13 into a form that is processable by a panel driver, and generate a control signal to be used to display the image signal on the display device 1.

The panel driver is to drive the panel of the liquid crystal display device, and may include a gate driver 22 for providing a gate signal onto a gate line and a source driver 23 for providing a data signal onto a data line. For example, the gate driver 22 and the source driver 23 may be implemented in a display driver integrated circuit (DDI).

The source driver 23 may convert the image data into an analog voltage and apply the analog voltage onto the gate line, and the gate driver 22 may apply analog voltage pulse waves onto the gate line according to a control signal.

The timing controller 16 may control the source driver 23 and the gate driver 22 to apply image data onto the gate line.

In the disclosure, the main controller 13 may update the driving data stored in the third storage 19 based on driving data corresponding to the driving information of the display panel 21 stored in the second storage 12 among the driving data for the plurality of panel types stored in the first storage 11, and the timing controller 16 may drive the display panel based on the updated driving data in the third storage 19.

The timing controller 16 may control the display panel by controlling the gate driver 22 and the source driver 23 based on the driving data in the third storage 19 updated by the main controller 13.

Figure 5:
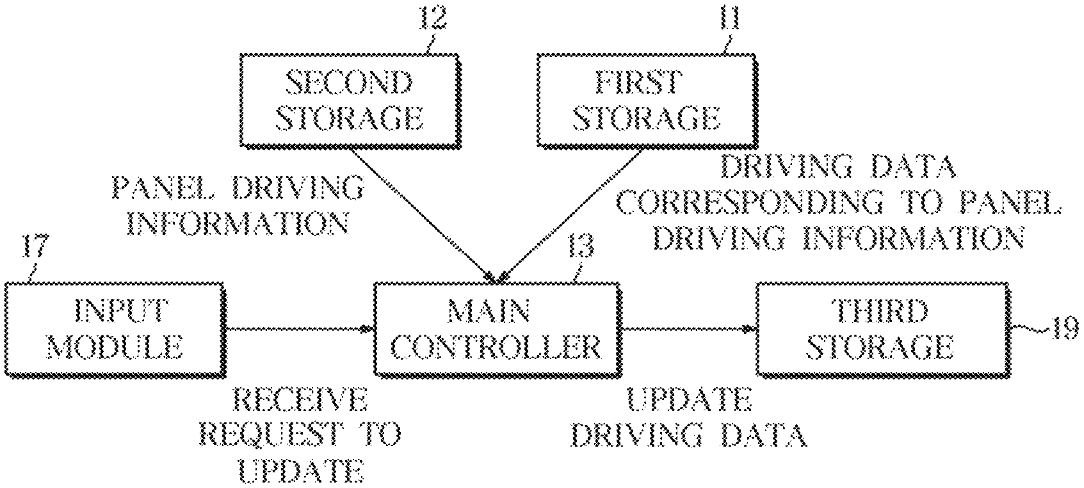
FIG. 5 is a control block diagram of a display device performing updating, according to an embodiment.

FIG. 5 is a control block diagram of a display device performing updating, according to an embodiment.

The display device 1 may further include an input module 17.

The input module 17 may receive a request to update the driving data from e.g., the user. Specifically, when the driving data needs to be updated because the display panel is not smoothly operated due to e.g., an error of the driving data, or there is new driving data, the display device 1 may receive a request from e.g., the user, to update the driving data, and the user may input the request to update the driving data through the input module 17.

The input module 17 may be implemented in a way of displaying an extra screen indicating the request to update the driving data on the display screen or making categories for the user to be able to request the updating through menus. This is merely an example, and may be implemented in various ways that may allow the user to request updating of the driving data.

When the request to update the driving data is input through the input module 17, the main controller 13 may update the driving data stored in the third storage 19.

A procedure in which the main controller 13 updates driving data will now be described.

Figure 6:
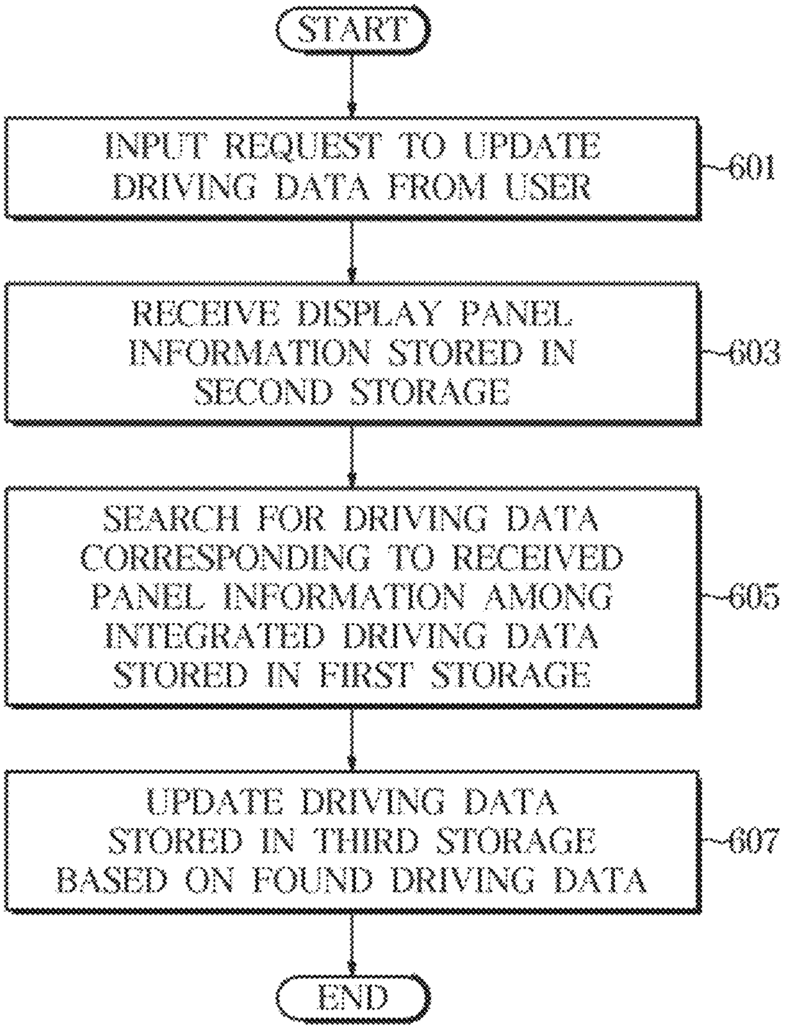
FIG. 6 is a flowchart illustrating a procedure for updating driving data, according to an embodiment.

FIG. 6 is a flowchart illustrating a procedure for updating driving data, according to an embodiment.

When a request to update driving data is input through the input module 17 in 601, the main controller 13 may receive driving information of the display panel stored in the second storage 12 in 603.

The driving information may include gate timing information, image quality characteristics or driving voltage operation of the display panel, as described above. It is also possible to make and store an ID for the information of the display panel.

The main controller 13 may search for driving data corresponding to the driving information of the display panel stored in the second storage 12 among the driving data for the plurality of panel types stored in the first storage 11, in 605.

In other words, whether there is driving data that matches the driving information of the display panel stored in the second storage 12 among the driving data for driving various types of panels may be found.

When driving data corresponding to the driving information of the display panel stored in the second storage 12 is searched for among the driving data for the plurality of panel types stored in the first storage 11, the main controller 13 may update the driving data stored in the third storage 19 based on the found driving data, in 607.

That is, the existing driving data stored in the third storage 19 may be replaced by the driving data found from the first storage 11, and the new driving data may be stored in the third storage 19. Accordingly, the timing controller 16 may drive the display panel based on the updated driving data that is stored in the third storage 19.

Figure 7:
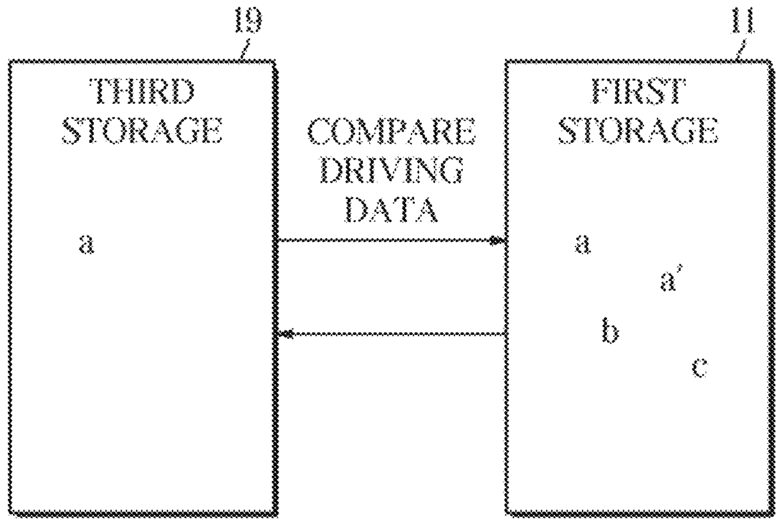
FIG. 7 is a diagram illustrating comparing of driving data, according to an embodiment.

FIG. 7 is a diagram illustrating comparing of driving data, according to an embodiment.

In updating the driving data, the main controller 13 may compare the driving data stored in the third storage 19 with driving data corresponding to the information of the display panel stored in the second storage 12 among the driving data for the plurality of panel types stored in the first storage 11.

In other words, the driving data stored in the third storage 19 for the timing controller 16 to drive the display may be compared with the driving data corresponding to the information of the display panel stored in the first storage 11.

In this case, when the driving data stored in the first storage 11 is of an upper version or different version than the driving data stored in the third storage 19, the main controller 13 may update the driving data stored in the third storage 19.

Referring to FIG. 7, the driving data stored in the third storage 19 is 'a', and driving data 'a'', 'b' and 'c' in addition to 'a' may be stored in the first storage 11.

The main controller 13 may search the first storage 11 for driving data 'a' and 'a'' corresponding to the driving information of the display panel but the driving data 'b' and 'c' for other types of panels.

'a' is the same version as the driving data stored in the third storage 19, so when such data is found, the main controller 13 may not update the driving data stored in the third storage 19.

When data 'a'' is searched for and is of an upper or different version than the existing 'a' stored in the third storage 19, the main controller 13 may store data 'a'' in the third storage 19 to update the existing driving data.

Specifically, when the driving data corresponding to the information of the display panel stored in the second storage 12 among the driving data for the plurality of panel types stored in the first storage 11 is of an upper version as a result of the comparing of the driving data, the main controller 13 may update the driving data stored in the third storage 19.

Furthermore, when the version of the driving data stored in the third storage 19 is different from the version of the driving data corresponding to the information of the display panel stored in the second storage 12 among the driving data for the plurality of panel types stored in the first storage 11 as a result of the comparing of the driving data, the main controller 13 may update the driving data stored in the third storage 19.

Figure 8:
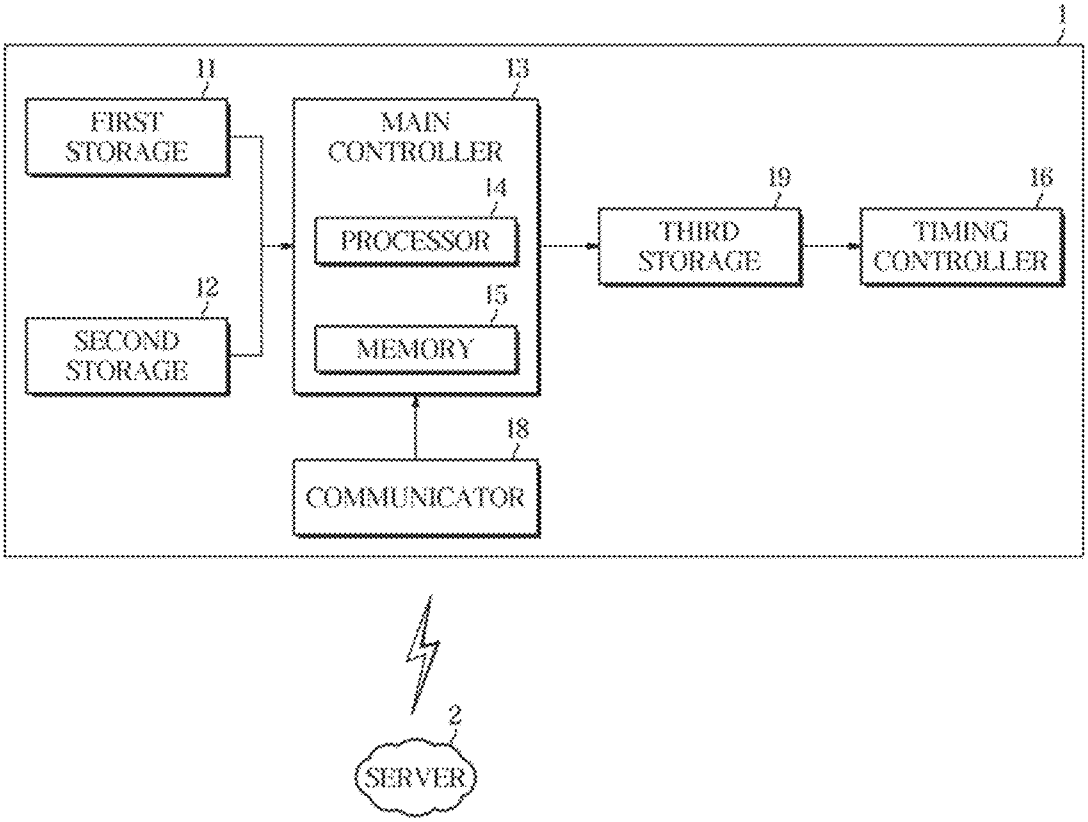
FIG. 8 is a control block diagram of a display device, according to another embodiment.

FIG. 8 is a control block diagram of a display device, according to another embodiment.

As described above, the first storage 11 may store driving data for a plurality of panel types. However, new driving data may be generated other than the driving data stored in the first storage 11, or the display device may be manufactured without storing driving data for the plurality of panel types in the first storage 11.

In this case, the driving data for the plurality of panel types may be received from the external server 2.

For this, the display device 1 may further include a communicator 18 for communicating with the external server 2.

The main controller 13 may store the driving data for the plurality of panel types received by the communicator 18 from the external server 2 through communication with the external server 2 in the first storage 11.

After this, the driving data stored in the third storage 19 may be updated based on the driving data corresponding to the driving information of the display panel stored in the second storage 12 among the driving data for the plurality of panel types stored in the first storage 11, as described above.

Through the communication with the external server 2, driving data that is not stored in the first storage 11 may be received and stored, and thus, various driving data may be stored.

Figure 9:
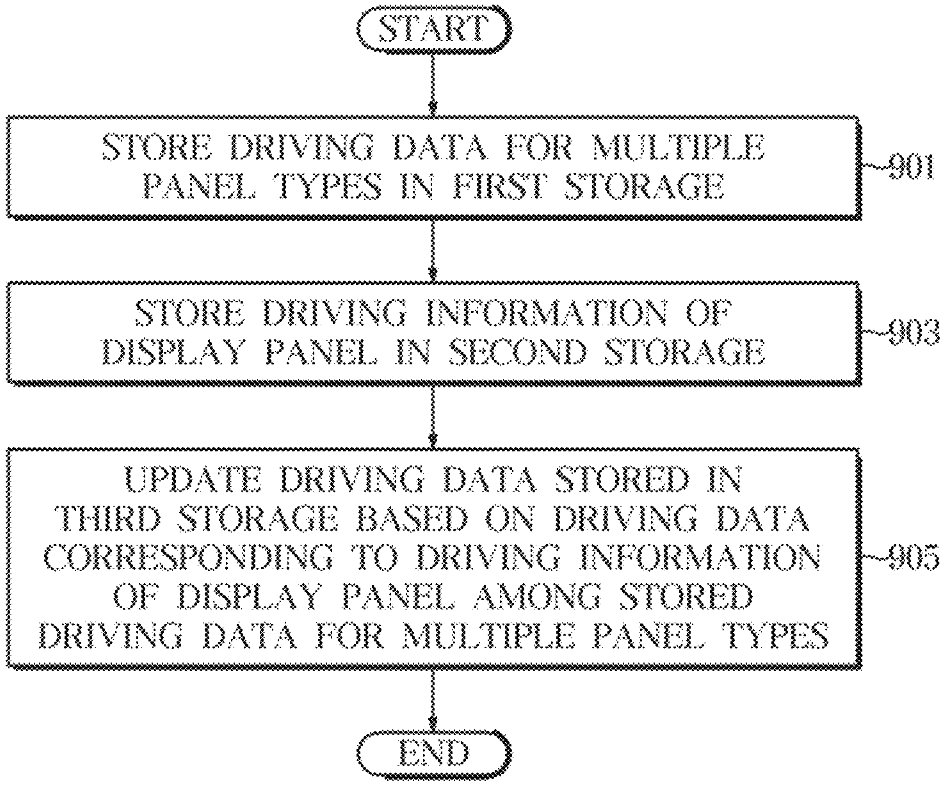
FIG. 9 is a flowchart illustrating a method of controlling a display device, according to an embodiment.

FIG. 9 is a flowchart illustrating a method of controlling a display device, according to an embodiment.

The display device 1 may include the first storage 11 for storing driving data for a plurality of panel types in 901, the second storage 12 for storing driving information of the display panel in 903, and the third storage 19 for storing for storing driving data for driving the display panel.

The main controller 13 may update the driving data stored in the third storage 19 based on driving data corresponding to the driving information of the display panel stored in the second storage 12 among the driving data for the plurality of panel types stored in the first storage 11, in 905.

Specifically, driving data corresponding to the unique driving information of the display panel stored in the second storage 12 is searched for from the first storage 11 that stores various types of driving data, and based on the found driving data, the driving data stored in the third storage 19 may be updated.

The timing controller 16 may drive the display panel based on the updated driving data in the third storage 19.

Figure 10:
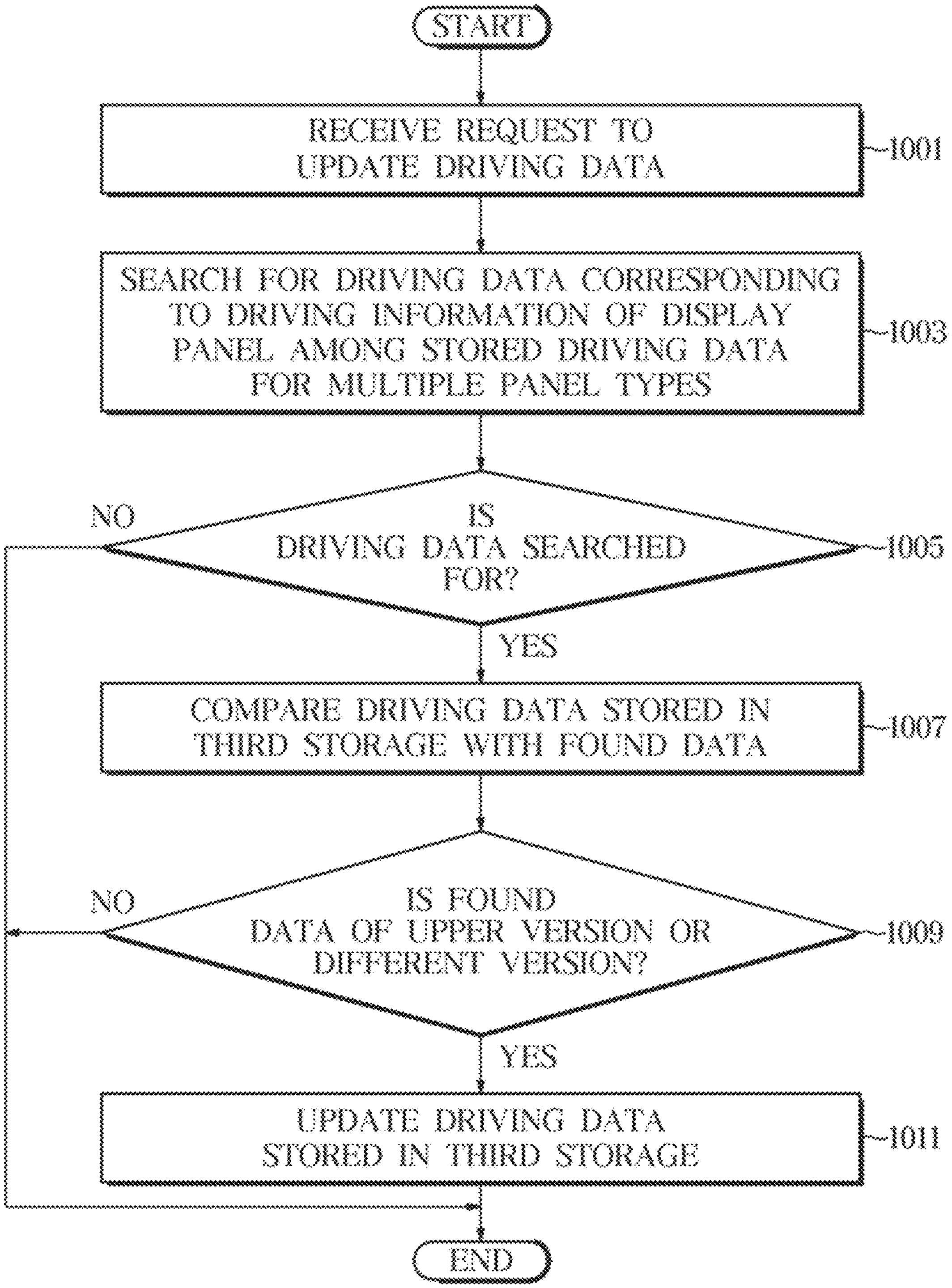
FIG. 10 is a flowchart illustrating a method of controlling a display device, according to an embodiment.

FIG. 10 is a flowchart illustrating a method of controlling a display device, according to an embodiment.

When a request to update the driving data is input from the user through the input module 17 in 1001, the main controller 13 may search for driving data corresponding to the driving information of the display panel stored in the second storage 12 among the driving data for the plurality of panel types stored in the first storage 11 in 1003.

In other words, whether there is driving data that matches the driving information of the display panel stored in the second storage 12 among the driving data for driving various types of panels may be found.

When the driving data corresponding to the driving information of the display panel stored in the second storage 12 among the driving data for the plurality of panel types stored in the first storage 11 is searched for in 1005, the main controller 13 may compare the driving data stored in the third storage 19 with the driving data corresponding to the information of the display panel stored in the second storage 12 among the drive data for the plurality of panel types stored in the first storage 11 in updating the driving data in 1007.

In other words, the driving data stored in the third storage 19 for the timing controller 16 to drive the display may be compared with the driving data corresponding to the information of the display panel stored in the first storage 11.

In this case, when the driving data stored in the first storage 11 is of an upper version or different version than the driving data stored in the third storage 19 in 1009, the main controller 13 may update the driving data stored in the third storage 19 in 1011.

When driving data corresponding to the driving information of the display panel stored in the second storage 12 is not searched for among the driving data for the plurality of panel types stored in the first storage 11 in 1005, or when the driving data stored in the first storage 11 is not of an upper version or different version than the driving data stored in the third storage 19 in 1009, the main controller 13 may not update the driving data.

According to the display device and method of controlling the same in the disclosure, a problem having to looking for a main board or a driving board with driving data that matches a display panel for replacement whenever there is a change in model in producing the display panel may be resolved by automatically searching for driving data corresponding to unique information of the display panel and updating, thereby reducing the process track time.

Furthermore, there is no need for a service person in charge to search for the driving data that matches a particular panel in person for updating, thereby reducing the time required for updating and reducing risks of human error occurrences.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. A display device comprising:

a display panel;

a first storage storing first driving data for a plurality of panel types;

a second storage storing driving information of the display panel;

a third storage storing third driving data to drive the display panel;

a timing controller configured to drive the display panel based on the third driving data stored in the third storage; and a main controller configured to compare the third driving data stored in the third storage with second driving data corresponding to the driving information of the display panel stored in the second storage among the first driving data for the plurality of panel types stored in the first storage, and update the third driving data stored in the third storage based on the second driving data corresponding to the driving information of the display panel stored in the second storage among the first driving data for the plurality of panel types stored in the first storage.

2. The display device of claim 1, further comprising:

an input interface configured to receive a request to update at least one of the first driving data, the second driving data, or the third driving data, wherein the main controller is configured to update the third driving data stored in the third storage based on the request to update the at least one of the first driving data, the second driving data, or the third driving data being received.

3. The display device of claim 2, wherein the main controller is configured to, based on the request to update the at least one of the first driving data, the second driving data, or the third driving data being received, search for the second driving data corresponding to the driving information of the display panel stored in the second storage among the first driving data for the plurality of panel types stored in the first storage.

4. The display device of claim 3, wherein the main controller is configured to update the third driving data stored in the third storage based on the searched for second driving data corresponding to the driving information of the display panel stored in the second storage among the first driving data for the plurality of panel types stored in the first storage.

5. The display device of claim 1, wherein the main controller is configured to update the third driving data stored in the third storage based on the second driving data corresponding to the driving information of the display panel stored in the second storage among the first driving data for the plurality of panel types stored in the first storage being of an upper version.

6. The display device of claim 1, wherein the main controller is configured to update the third driving data stored in the third storage based on a version of the third driving data stored in the third storage being different from a version of the second driving data corresponding to the driving information of the display panel stored in the second storage among the first driving data for the plurality of panel types stored in the first storage as a result of the comparing.

7. The display device of claim 1, wherein the driving information of the display panel comprises at least one of gate timing information, image quality characteristics information, or driving voltage information.

8. A display device comprising:

a display panel;

a first storage storing first driving data for a plurality of panel types;

a second storage storing driving information of the display panel;

a third storage storing third driving data to drive the display panel;

a timing controller configured to drive the display panel based on the third driving data stored in the third storage; and a main controller configured to update the third driving data stored in the third storage based on second driving data corresponding to the driving information of the display panel stored in the second storage among the first driving data for the plurality of panel types stored in the first storage, wherein the timing controller is configured to drive the display panel based on the updated third driving data.

9. The display device of claim 1, further comprising: a communicator configured to communicate with an external server, wherein the main controller is configured to store the first driving data for the plurality of panel types received from the communicator in the first storage.

10. A method of controlling a display device including a first storage storing first driving data for a plurality of panel types; a second storage storing driving information of a display panel; and a third storage storing third driving data to drive the display panel, the method comprising:

searching for second driving data corresponding to the driving information of the display panel stored in the second storage among the first driving data for the plurality of panel types stored in the first storage;

comparing the third driving data stored in the third storage with second driving data corresponding to the driving information of the display panel stored in the second storage among the first driving data for the plurality of panel types stored in the first storage, and updating the third driving data stored in the third storage based on the second driving data corresponding to the driving information of the display panel stored in the second storage among the first driving data for the plurality of panel types stored in the first storage; and driving the display panel based on the updated third driving data.

11. The method of claim 10, further comprising:

receiving a request to update at least one of the first driving data, the second driving data, or the third driving data, wherein the updating of the third driving data comprises updating the third driving data stored in the third storage based on the request to update the at least one of the first driving data, the second driving data, or the third driving data being received.

12. The method of claim 10, wherein the updating of the third driving data comprises updating the third driving data stored in the third storage based on the second driving data corresponding to the driving information of the display panel stored in the second storage among the first driving data for the plurality of panel types stored in the first storage being of an upper version.

13. The method of claim 10, wherein the updating of the third driving data comprises updating the third driving data stored in the third storage based on a version of the third driving data stored in the third storage being different from a version of the second driving data corresponding to the driving information of the display panel stored in the second storage among the first driving data for the plurality of panel types stored in the first storage as a result of the comparing.

14. The display device of claim 1, wherein the timing controller is further configured to convert an image signal from the main controller and generating a control signal to display the image signal on the display device.

15. The method of claim 1, further comprising converting an image signal from the main controller and generate a control signal to display the image signal on the display device.

* * * * *